United States Patent [19]

Takaragi et al.

[11] Patent Number: 5,784,483
[45] Date of Patent: Jul. 21, 1998

[54] IMAGE PROCESSING APPARATUS

[75] Inventors: Yoichi Takaragi, Yokohama; Eiji Ohta, Fujisawa, both of Japan

[73] Assignee: Canon Kabushiki Kaisha, Tokyo, Japan

[21] Appl. No.: 355,118

[22] Filed: Dec. 13, 1994

Related U.S. Application Data

[63] Continuation of Ser. No. 22,568, Feb. 25, 1993, abandoned.

[30]   Foreign Application Priority Data

Feb. 28, 1992  [JP]  Japan ................... 4-043892

[51] Int. Cl.⁶ ........................................ G06K 9/00
[52] U.S. Cl. ............................ 382/135; 382/165
[58] Field of Search ............... 382/112, 135, 382/162, 165, 309, 155, 157, 159, 160; 355/201; 399/234, 288, 386

[56]        References Cited

U.S. PATENT DOCUMENTS 3,713,097  1/1973  Linnerooth .................. 382/57
4,769,532  9/1988  Kawakami ................... 382/135
4,881,268  11/1989 Uchida et al. .................. 382/7
4,908,873  3/1990  Philibert et al. ............. 355/201
5,216,724  6/1993  Suzuki et al. ............... 355/201
5,227,871  7/1993  Funada et al. ................. 382/7
5,321,470  6/1994  Hasuo et al. ................ 382/309
5,335,291  8/1994  Kramer et al. .............. 382/309

FOREIGN PATENT DOCUMENTS 0463804  1/1992  European Pat. Off. ...... G07D 7/00

*Primary Examiner*—Leo Boudreau
*Assistant Examiner*—Christopher Kelley
*Attorney, Agent, or Firm*—Fitzpatrick, Cella, Harper & Scinto

[57]          ABSTRACT

An image processing apparatus performs a judging function of judging similarity between an image represented by input image data and a specific image; tests the judging function; and sets one of a first mode for referring an ordinary judging operation and a second mode for performing a test judging operation to test the judging function, using different judging standards in the first and second mode respectively.

27 Claims, 22 Drawing Sheets

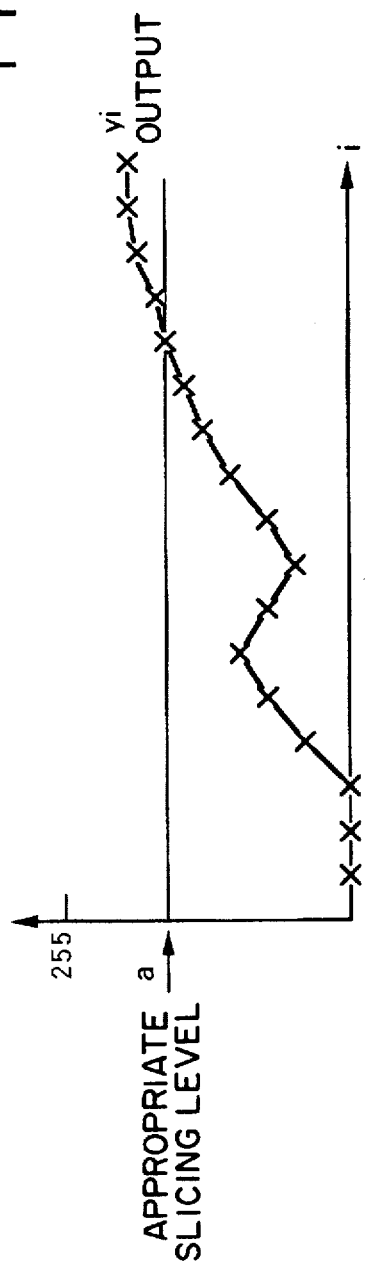
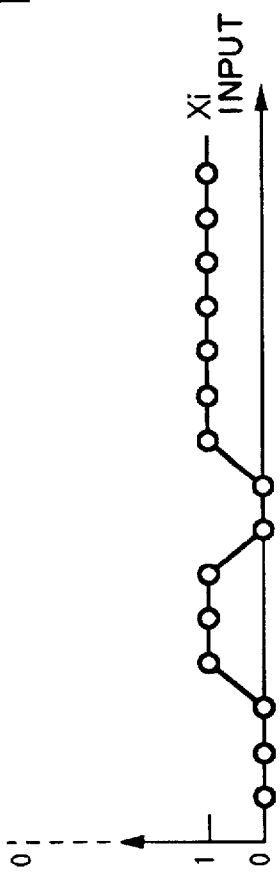

IMAGE PROCESSING APPARATUS

This application is a continuation of application Ser. No. 08/022,568 filed Feb. 25, 1993, now abandoned.

BACKGROUND OF THE INVENTION

The present invention relates to an image processing apparatus and, more particularly, to an image processing apparatus capable of discriminating a specific original from original images.

Recent improvements in copying machines have resulted in a high quality reproducibility of originals.

One technique for preventing the duplication of an original which is prohibited from being copied, is to register beforehand the data in color space of such a specific original and provide means for judging if the data distribution of an input original image and that of the specific original image coincide in color space. Such a technique has been disclosed by the present applicant in U.S. patent application Ser. No. (715922 filed on Jun. 14, 1991) now abandoned.

However, in the related art described above, no specific test mode is provided to check if the judging function of the specific original is properly operating. Therefore, to test the judging function, the specific originals such as bank notes and securities need to be actually read. However, they are prohibited from being duplicated even for the purpose of testing the judging function of the image processing apparatus. Accordingly, it is impossible to test the judging function once the apparatus has been shipped out of factory.

Furthermore, there is the problem that the judging function does not operate properly if the characteristics of the analog processing unit of the CCD sensor is effected by a secular change or the circuits are reconstructed on purpose. Accordingly, a technique capable of easily testing the judging function during check up at regular maintenance has been needed.

SUMMARY OF THE INVENTION

Accordingly, it is an object of the present invention to provide an image processing apparatus capable of eliminating the aforementioned drawback of the prior art described above.

Another object of the present invention is to provide an image processing apparatus capable of easily testing a function of judging specific originals.

Another object of the present invention is to provide an image processing apparatus, as a computer, capable of easily testing a function of judging specific originals.

Another object of the present invention is to provide an image processing apparatus capable of outputting and displaying a message as the result of the testing of the judging function of specific originals.

Yet another object of the present invention is to provide an image processing apparatus capable of guaranteeing an accurate operation of the judging function so as not to permit the reading of an original to be copied until the judging function is tested properly.

Yet another object of the present invention is to provide an image processing apparatus comprising of a first mode and second mode according to the original judgment, the first mode having judging means for judging the degree of similarity of the input image data and plurality of specific images, and processing means for processing the image data in accordance with the result of judgment of the judging means, and the second mode having testing means for testing the judging function of the judging means.

Yet another object of the present invention is to provide an image processing apparatus comprising a first mode and second mode according to the original judgment, the first mode having a judging means for judging the degree of similarity of input image data and a plurality of specific images and processing means for processing the image data in accordance with the result of judgment of the judging means, and the second mode having a testing means for testing the judging function of the judging means, and authorizing/unauthorizing means for authorizing the execution of the first mode in the case where the predetermined test result by the testing means is positive, while unauthorizing the execution in the case where the predetermined test result by the testing means is negative.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

FIGS. 8A and 8B are diagrams showing the relationship between an input $x_i$ and smoothed output value $y_i$;

DESCRIPTION OF THE PREFERRED EMBODIMENTS

Preferred embodiments of the present invention will now be described in detail in accordance with the accompanying drawings.

<The First Embodiment>

(Block Diagram of the Signal Processing)

Figure 1:
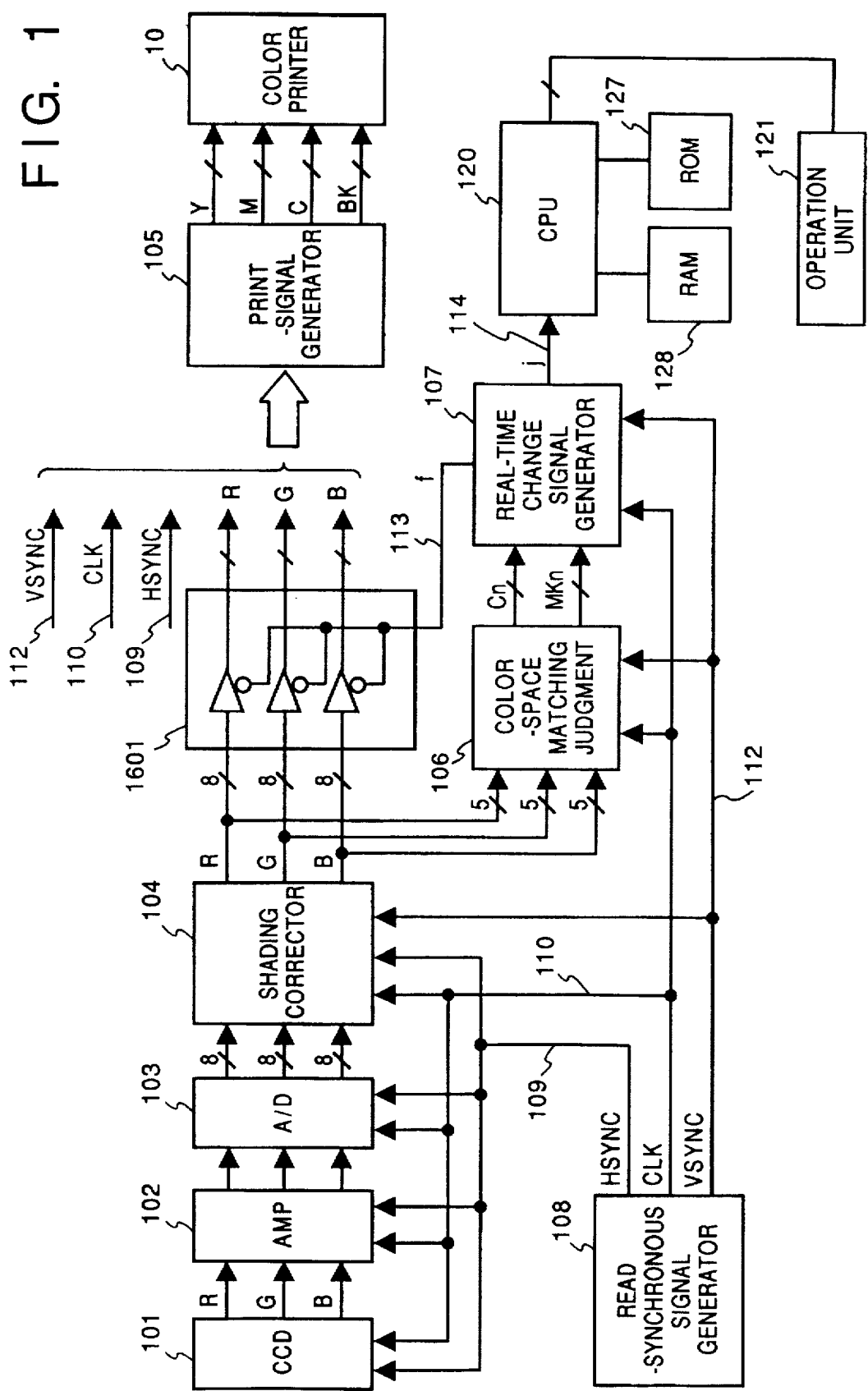
FIG. 1 is a block diagram illustrating the signal processing of a color image reading apparatus according to a first embodiment of the present invention.

FIG. 1 is a block diagram illustrating the signal processing of the color image reading apparatus of the first embodiment of the present invention. The color image reading apparatus shown in FIG. 1 connects to a color printer 10.

In FIG. 1, numeral 101 is a color sensor comprising CCD line sensor of R (red), G (green), B (blue), numeral 102 is an analog amplifier, numeral 103 is an A/D convertor, and numeral 104 is a shading correcting circuit for correcting dispersions of brightness at the reading position of the image signal.

Figure 10:
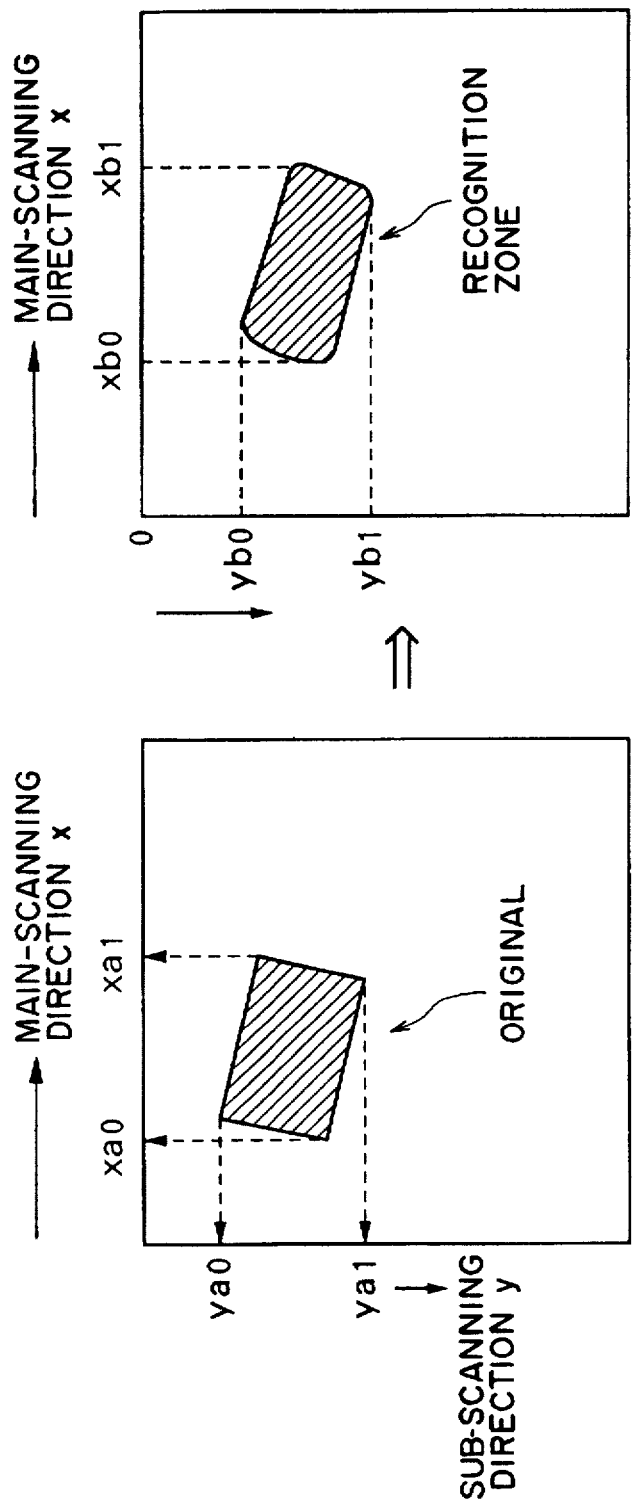
FIG. 10 is a diagram showing the relationship between the position of the original on a platen and recognized area.

Numeral 106 is a color-space matching judgment circuit for calculating the degree of similarity between the color distribution of the image data R, G, and B obtained by reading an original and that of the data obtained from the test original or specific originals, such as bank notes or securities, in a three-dimensional color space in real-time. Brightness and color distortion according to the position of the original are corrected by using the color signal after the shading correction by the shading correction circuit 104 and a judgment of the degree of similarity in the color space can be accurately performed regardless of the position where the original is placed. FIG. 10 illustrates the relationship between the position of the specific original on the platen and recognition zone. In FIG. 10, in the case where the specific original is located at $xa_0$–$xa_1$ in the main scanning direction and $ya_0$–$ya_1$ in the subordinate scanning direction, the recognition zone is located at $xb_0$–$xb_1$ in the main scanning direction and $yb_0$–$yb_1$ in the subordinate scanning direction.

Numeral 105 is a print-signal generation circuit which converts input color signals of R (red), G (green), B (blue) read by the color sensor 101 into signals of Y (yellow), M (magenta), C (cyan), Bk (black). Numeral 107 is a real-time change signal generation circuit which generates a real-time change signal f (signal line 113). The input image signal is modulated by the real-time change signal f. For example, where the original on the platen is identified as a specific original, a pitch-black image can be formed by outputting a maximum value with the RGB signals in real-time.

Numeral 108 is a read-synchronous signal generation circuit which generates a main scanning direction interval signal HSYNC (signal line 109), primary clock signal CLK (signal line 110), and interval signal VSYNC (signal line 112) indicating the effective zone in the subordinate scanning direction.

Numeral 120 is a CPU which controls the apparatus and control unit 121, and particularly making it possible to display the test result of the judging function. Numeral 127 is a ROM which stores a program to operate the CPU 120. Numeral 128 is a RAM used as a work area of various programs. The ROM 127 stores the program for testing the judging function to follow the flowchart of FIG. 17 (which will described later).

Numeral 1601 is a modifying circuit which modifies the RGB signals from the shading circuit 104 by the real-time change signal f indicating the result of judgment whether the original is a specific original.

(Color-Space-Matching Judgment Circuit 106)

Figure 2:
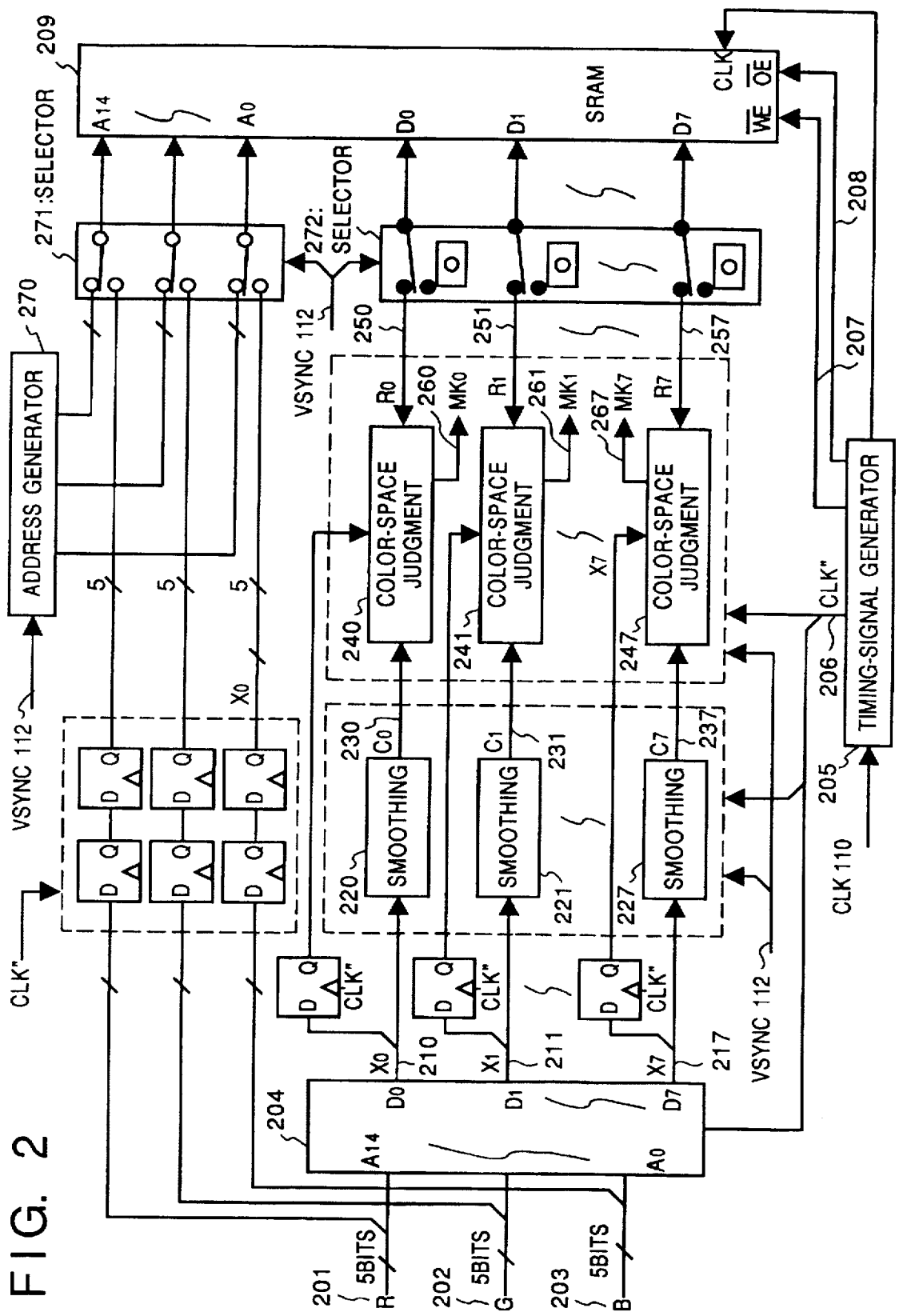
FIG. 2 is a block diagram illustrating the construction of a color-space matching judgment circuit 106 of the first embodiment.
Figure 9:
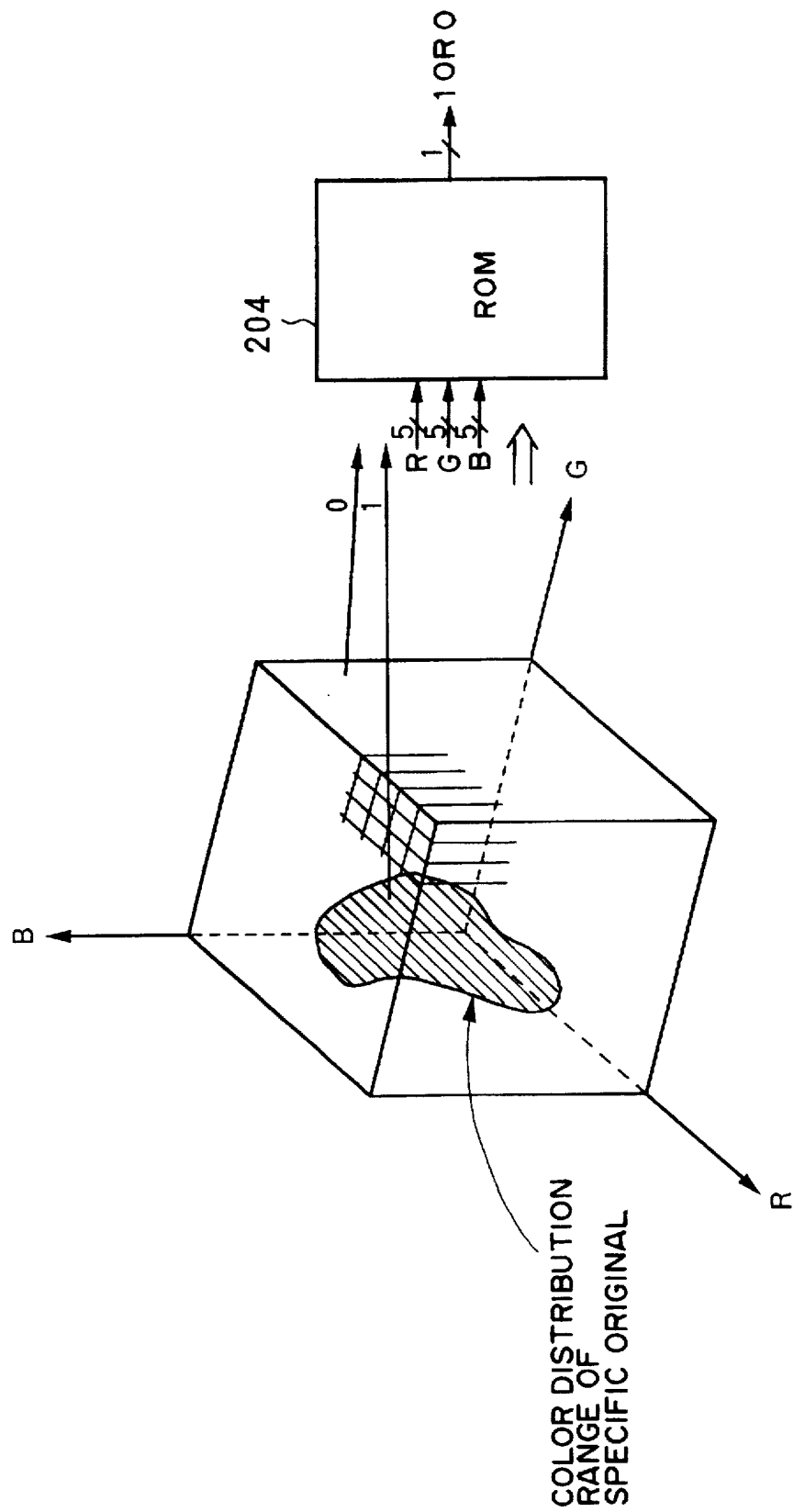
FIG. 9 is a diagram showing the relationship between a shape in the color space formed from a specific original and the data stored in the ROM 204 in the first embodiment.

FIG. 2 is a block diagram illustrating the construction of the color-space matching judgment circuit 106 according to the first embodiment. FIG. 9 is a diagram showing the color distribution formed from the specific original in the R-G-B three-dimensional color space and ROM 204 which stores a set of the input signals RGB and 1-bit judging signal as data of the color distribution in the first embodiment.

In FIG. 2, numeral 201 is a R (red) signal which is the data of the five higher order address bits and come from the eight-bit R signal from the shading correcting circuit 104. Similarly, numeral 202 is a five-bit G (green) signal and numeral 203 is a five-bit B (blue) signal. Numeral 204 is a ROM which beforehand stores data relating to the colors of a plurality of types (eight types) of specific originals. That is, the data on the eight types of the color distribution shown in FIG. 9 are stored in a single ROM. The test original and each type of the specific originals stored as data in the ROM 204 is hereinafter referred to as a "prohibited master". The R, G, B signals 201–203 are inputted as addresses $A_0$ through $A_{14}$. Subsequently, a judgment signal (1 bit×8 types) indicating whether the inputted R, G, B signals 201–203 coincide with the colors of the plurality of the prohibited masters is outputted from the output terminals $D_0$–$D_7$ as data $R_0$–$R_7$. The prohibited master corresponding to the "test original" described later is included in the eight types of the prohibited masters.

Figure 4:
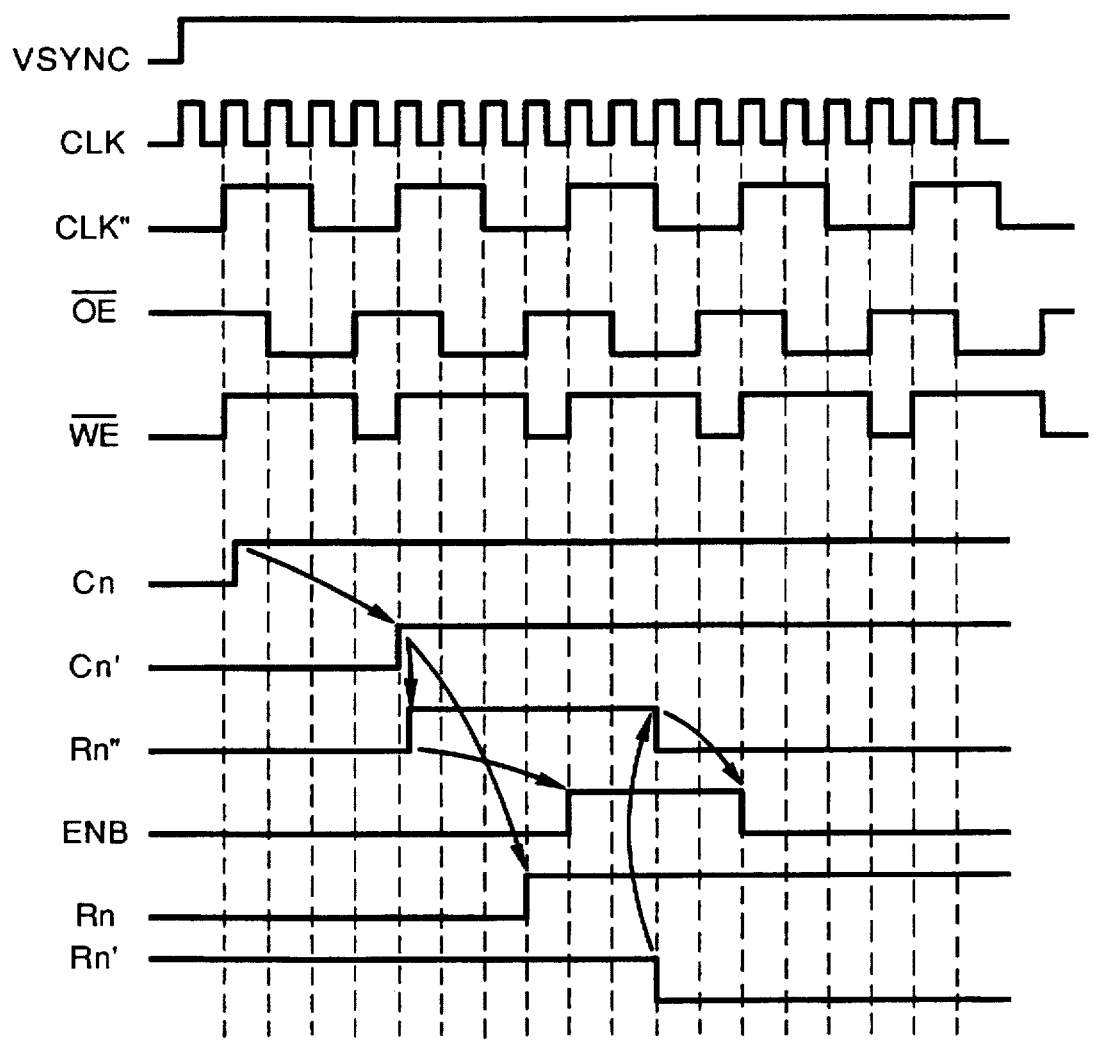
FIG. 4 is a timing chart relating to data reading/writing from/to the SRAM 209 in the first embodiment.

Numeral 205 is a timing signal generation circuit for generating a timing signal shown in FIG. 4. Numeral 206 is a clock signal (CLK") obtained by frequency division of the CLK signal by four. Numeral 207 is a signal to control a write-enable-terminal of an SRAM 209 and numeral 208 is a signal to control an output-enable-terminal of the SRAM 209.

The data stored in the ROM 204 includes the information related to the colors of the eight types of the prohibited master as shown in FIG. 9. If an input color of the original coincides with the color of the prohibited master, "1" is respectively outputted to output terminals $D_0$–$D_7$ as color judgment signals $x_0$–$X_7$. While if they do not coincide, "0" is respectively outputted to the output terminals $D_0$–$D_7$. The color judgment signals "$x_0$–$x_7$" are judgment signals respectively corresponding to the eight types of the prohibited masters A through H (obtained from the test original A and specific originals B through H).

Numerals 271, 272 are selectors, numeral 270 is an address generator, numerals 220–227 are smoothing circuits, and numerals 240–247 are color-space judging circuit.

Figure 11:
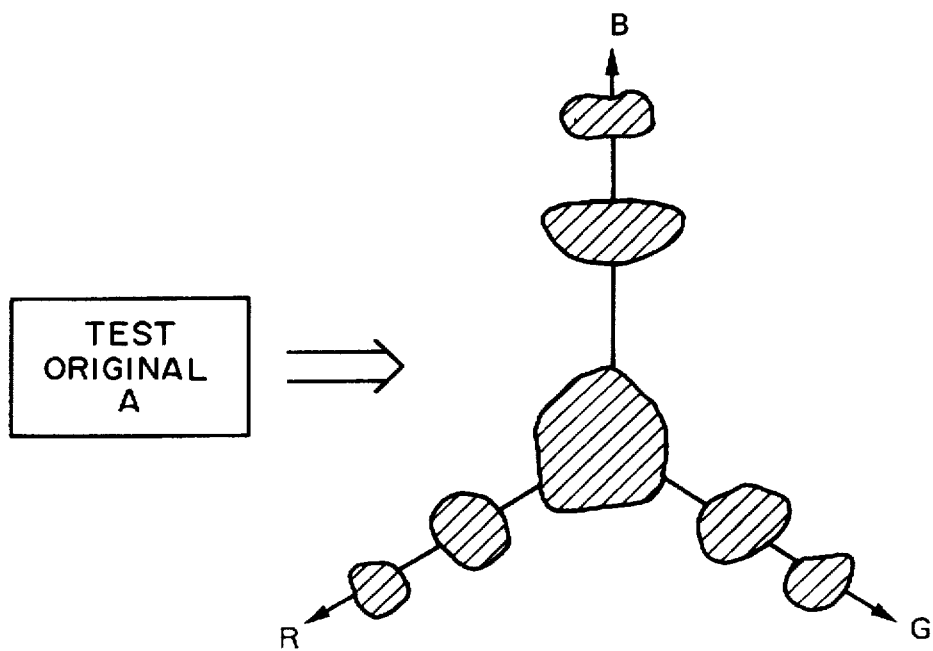
FIG. 11 is a diagram illustrating the distribution of the data obtained from a test original A (1801) in the color space in the first embodiment.
Figure 13:
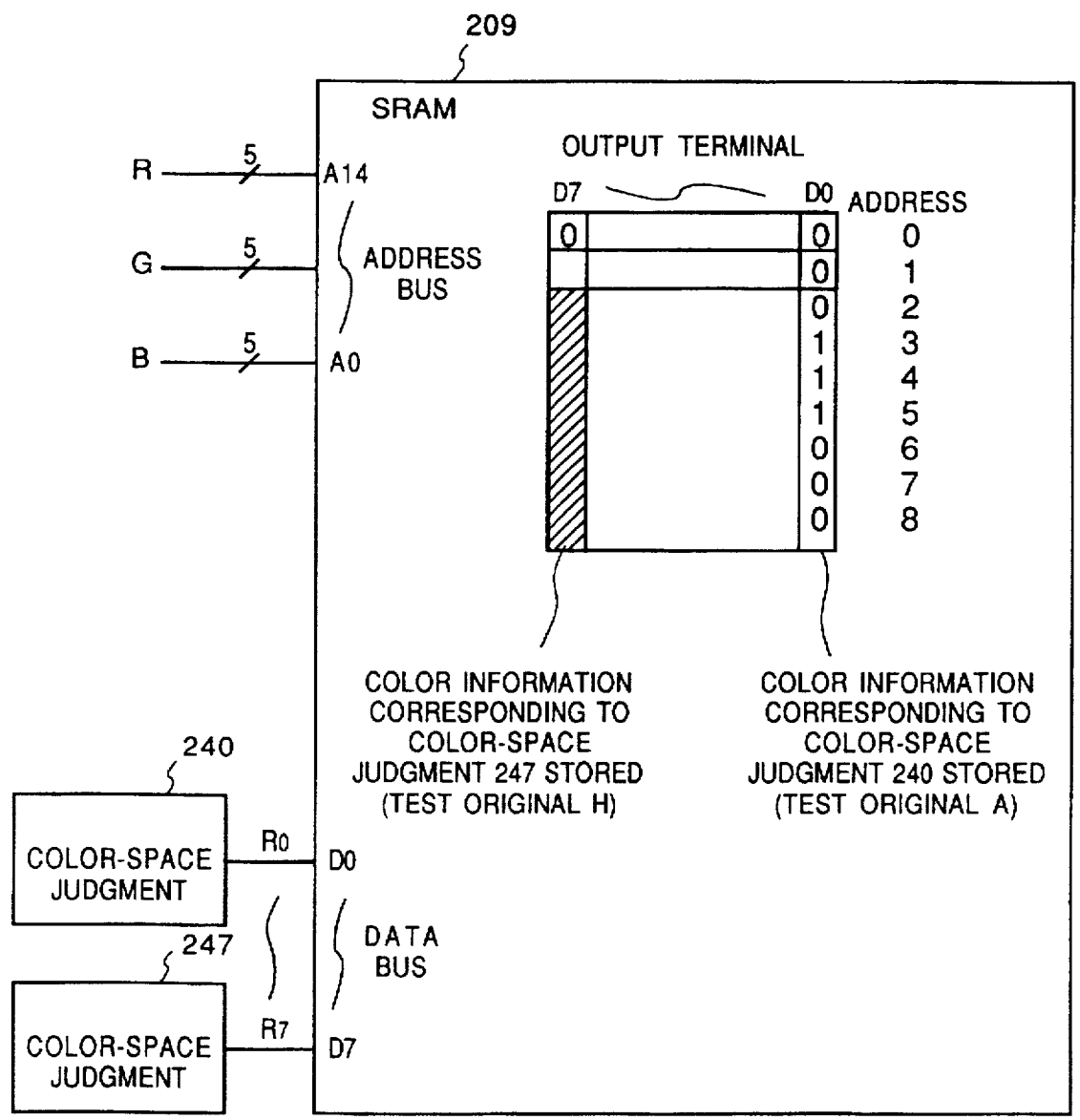
FIG. 13 is a diagram showing the relationship between the data relating to the colors obtained from the test original and a plurality of specific originals stored in the ROM 204 and bit position of the ROM 204.
Figure 18:
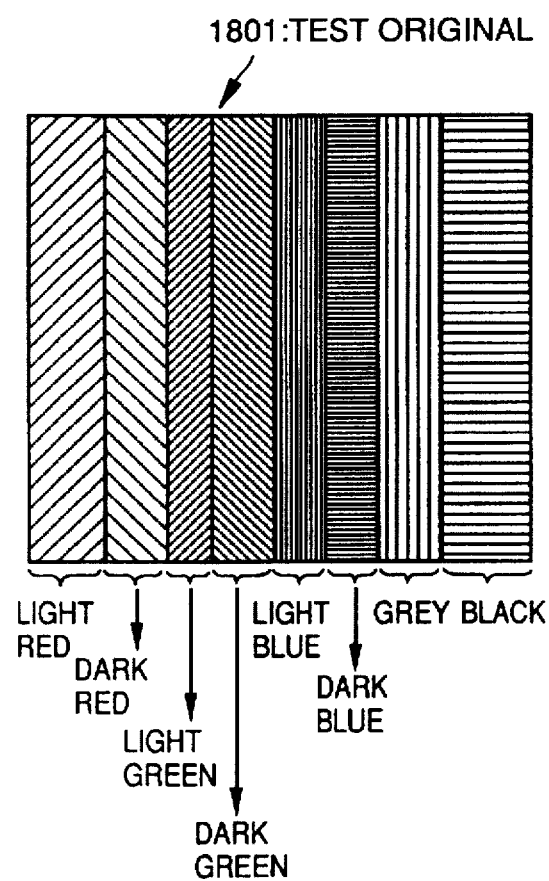
FIG. 18 is a diagram for describing a test original in the first embodiment.

FIG. 11 is a diagram illustrating the color distribution of the prohibited master A (which contains the same data as that of the "test original" 1801 for testing the judging function) in the color space used in the first embodiment. FIG. 18 is a diagram for describing the test original in the first embodiment. FIG. 13 is a diagram showing the data, stored in the SRAM 209, on the relationship between the colors of the original on the platen and those of the eight types of the prohibited masters, and the relationship of the bit position of the SRAM 209.

As shown in FIG. 13, each of the judgement information $R_0 \sim R_7$ (signal lines 250–257) relating to the colors of the eight types of the prohibited masters is outputted from the output terminals $D_0 \sim D_7$ to the inputted image data in parallel. In FIG. 13, the color information (prohibited master A) which is stored in the address bit 0 (corresponding to $D_0$) of the SRAM 209 is the color information relating to the test original 1801 shown in FIGS. 11 and 18.

Figure 7:
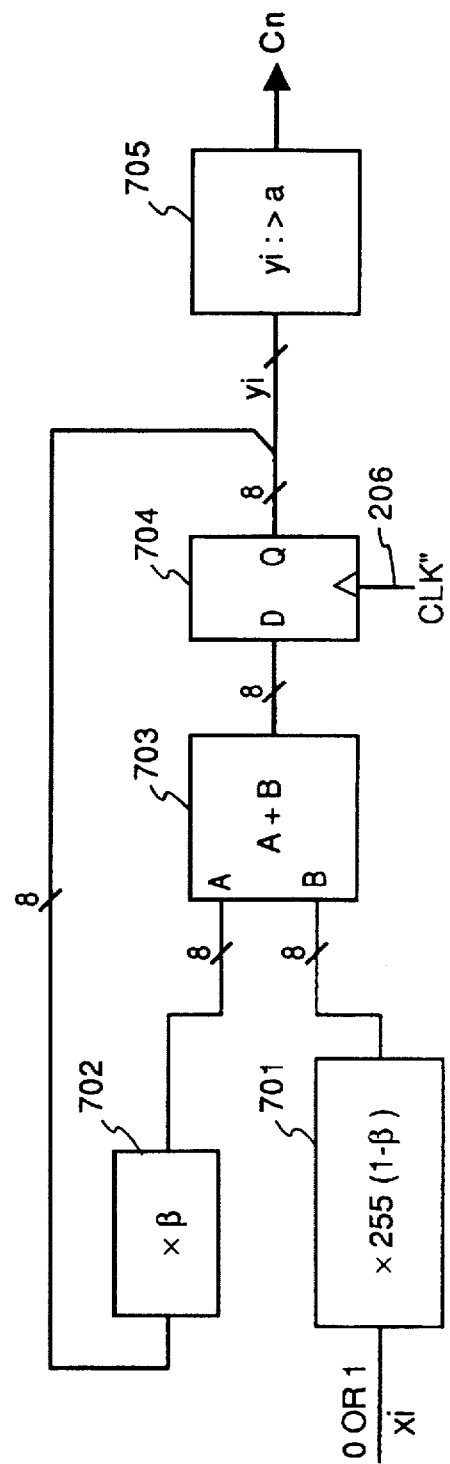
FIG. 7 is a is a block diagram illustrating the construction of smoothing circuits 220-227 of the first embodiment.

The smoothing circuits 220–227 perform a smoothing calculation shown in FIGS. 7 and 8 by using the signals of the color judging signals $x_0 \sim x_7$ (signal lines 210–217).

FIG. 7 is a block diagram illustrating the construction of the smoothing circuits 220–227 in the first embodiment. In this figure, numerals 701 and 702 are multipliers, numeral 703 is an adder, numeral 704 is a latch circuit, and numeral 705 is a comparator.

In the construction described above, it is possible to judge with continuity as shown in FIGS. 8A and 8B by the weighted average of the input data from the multipliers 701, 702, adder 703 and the preceding data.

FIGS. 8A and 8B shows the relationship between the input $x_i$ and output value $y_i$ in the first embodiment. As shown in these figures, if the input value $x_i$ continues (FIG. 8A), the value $y_i$ is increased (FIG. 8B).

Accordingly, in the case where the R, G, B signals continuously coincide with the colors of the prohibited masters, some of the signals $C_0 \sim C_7$ (signal lines 230–237) become "1" (there is the case where the plural signals become "1"), a more accurate judgment is enabled without influence from noise.

Figure 14:
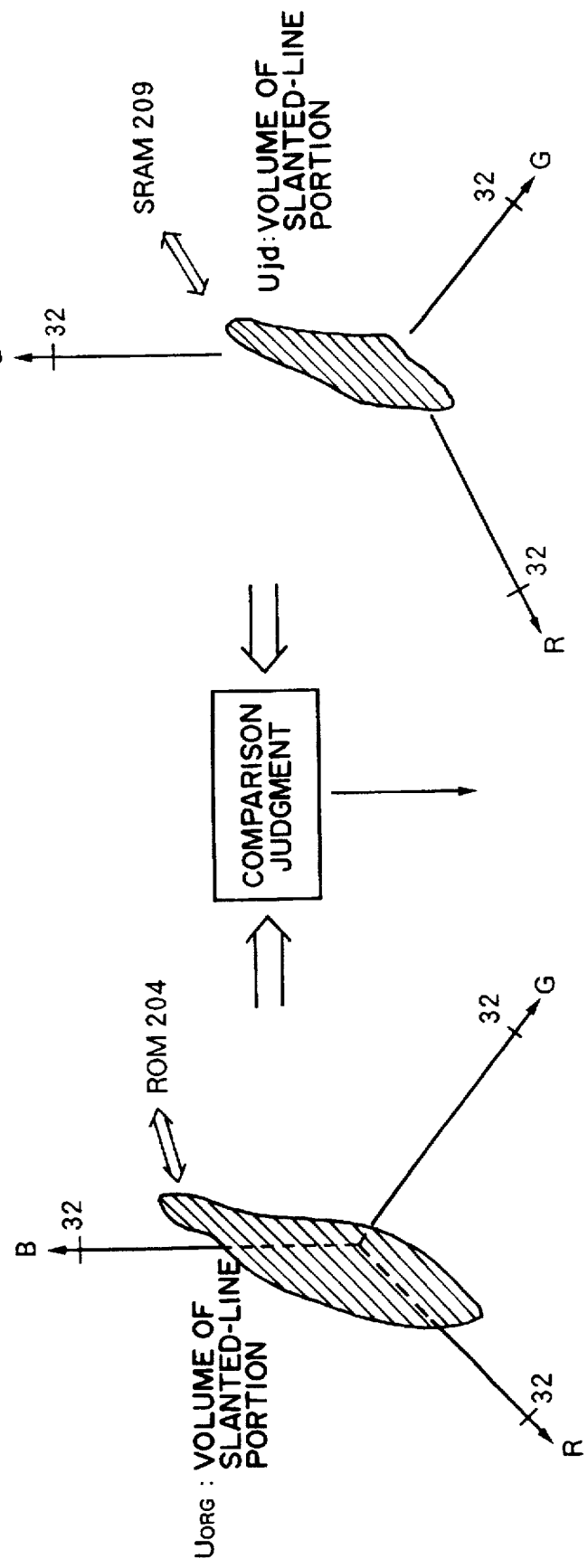
FIG. 14 is a diagram which conceptually describes the judgment of similarity of the distribution of the data obtained from an input color image in the color space and the distribution of the data obtained from the test original or specific original.

FIG. 14 is a diagram for conceptually describing the judgement of the degree of similarity of the color distribution of the input color image in the color space and color distribution of the prohibited master.

In the color-space judging circuits 240–247, the degree of similarity of the prohibited master data in the R, G, B color space and input color signal is calculated in real-time and the color-space similarity judgment signals $MK_0 \sim MK_7$ (signal lines 260–267) are calculated.

Figure 3:
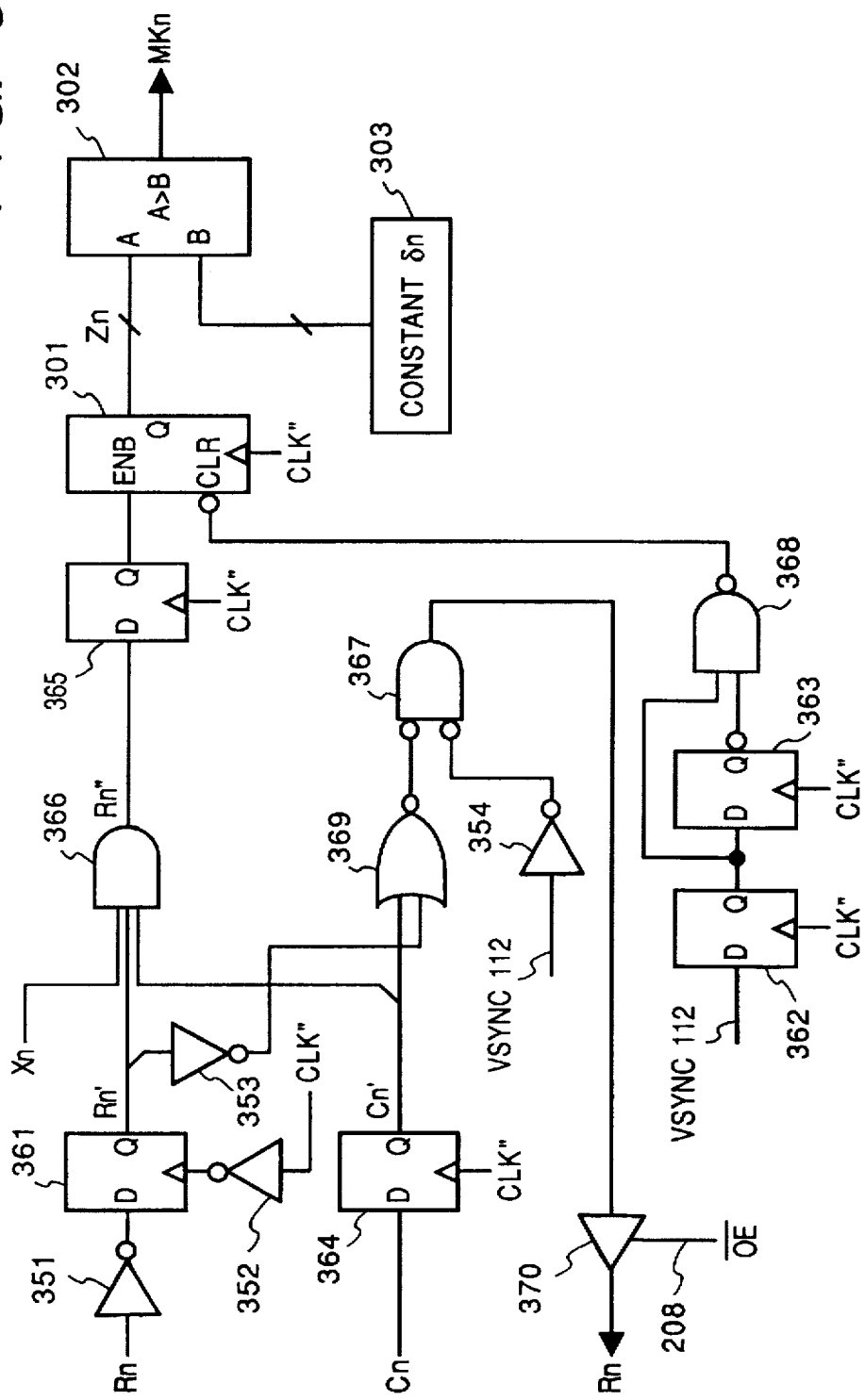
FIG. 3 is a block diagram illustrating the construction of color-space judging circuits 240-247 of the first embodiment.

FIG. 3 is a block diagram illustrating the construction of the color-space judging circuit according to the first embodiment. In FIG. 3, numeral 301 is a 10-bit counter, numeral 302 is a comparator, numeral 303 is a register, numerals 351–354 are inverters, numerals 361–365 are D-flip flops, numeral 366 is an AND gate, numerals 367, 368 are NAND gates, numeral 369 is a NOR gate, and numeral 370 is a buffer.

The present construction implements a logical OR operation of the data $R_n$ from the SRAM 209 and signal $C_n$ from the smoothing circuit. The result is written in the SRAM 209. Only in the case where the data $R_n$ is changed from "0" to "1", the 10-bit counter 301 becomes count enable (ENB) and counted up. The counter 301 is cleared at the leading edge of the subordinate scanning interval signal VSYNC (line signal 112). The output value $Z_n$ of the counter 301 and constant $\delta_n$ of the register 303 are compared by the comparator 302. When $Z_n > \delta_n$, MK=1, while when $Z_n \leq \delta_n$ MK=0. The value $\delta_n$ is set to a value which is equal to 1 % of $U_{ORG}$ of FIG. 14 (where $U_{ORG}$=90). That is, the value $\delta_n$ is expressed by:

$$\delta_n = \frac{1}{100} \times U_{ORG} \tag{1}$$

In FIG. 14, $U_{ORG}$ is a value expressed in a unit of cube obtained by dividing each of R, G, B axis in the three dimensions into 32.

According to the processing described above, when observed image data, that is, the data distribution of a string of input color signals almost corresponds to the prohibited image data distribution in the RGB color space, the color-space similarity judgment signal $MK_0 \sim MK_7$ (signal lines 260–267) is set to "1".

The selectors 271 and 272 clears the SRAM 209 to "0" when the subordinate scanning interval signal VSYNC (signal line) 112 is "0" (LOW). The address generator 270 is a circuit for sequentially generating all addresses of the SRAM 209. When the interval signal VSYNC (signal line) 112 is at LOW, the SRAM 209 is cleared to "0" in accordance with the address signal generated by the address generator 270.

FIGS. 4A and 4B are timing charts relating to reading/writing from/on the SRAM 209.

(Real-Time Change Signal Generation Circuit)

Figure 5:
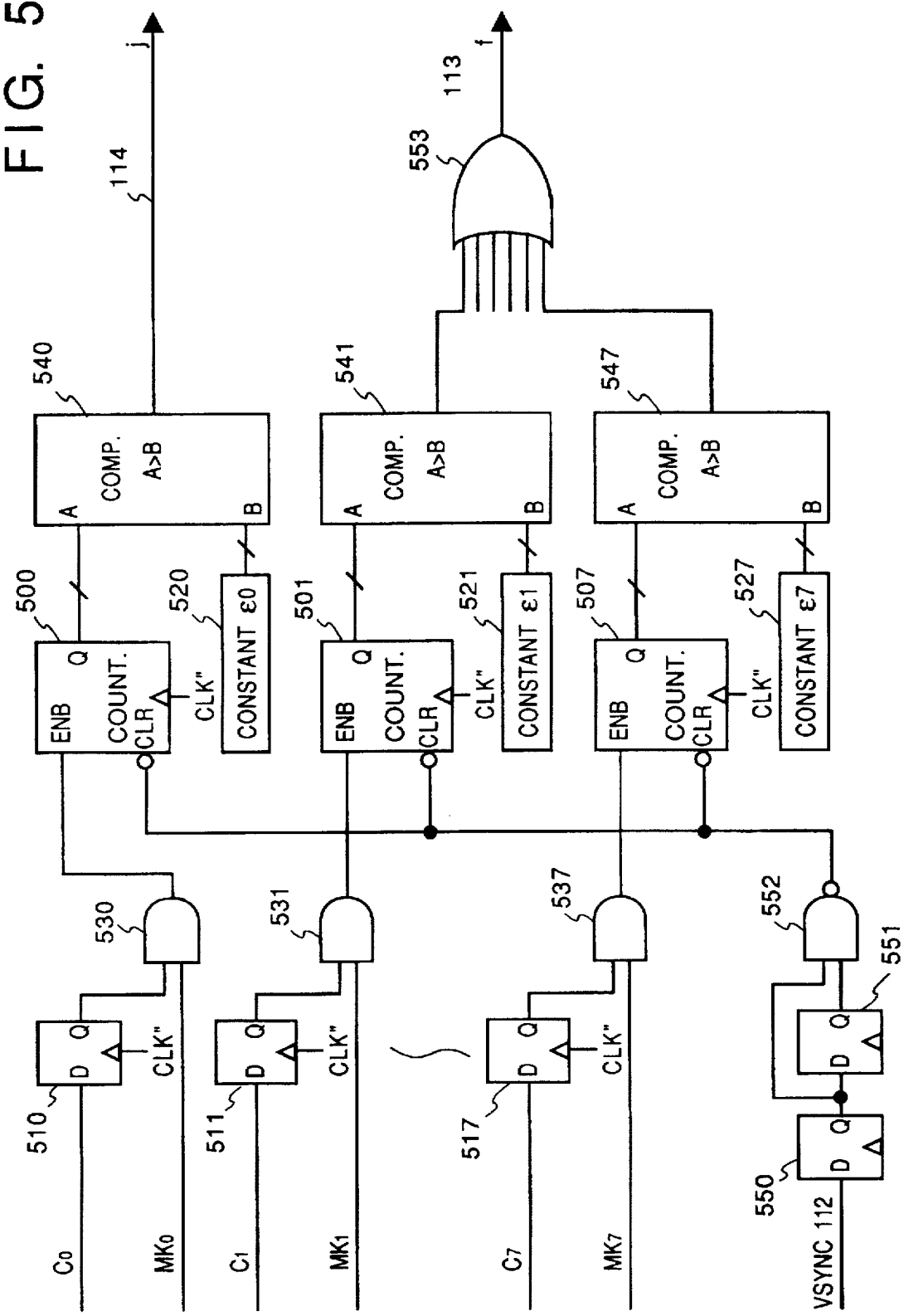
FIG. 5 is a block diagram illustrating the construction of a real-time change signal generating circuit 107 according to the first embodiment.

FIG. 5 is a block diagram illustrating the construction of the real-time change signal generation circuit 107 according to the first embodiment. In FIG. 5, numerals 113 and 114 are signal lines, numerals 500–507 are 16-bit counters, numerals 510–517, 550, 551 are D-flip flops, numerals 530–537 are AND gates, numeral 552 is a NAND gate, numerals 520–527 are registers, numerals 540–547 are comparators, and numerals 553 is an OR gate.

Figure 12:
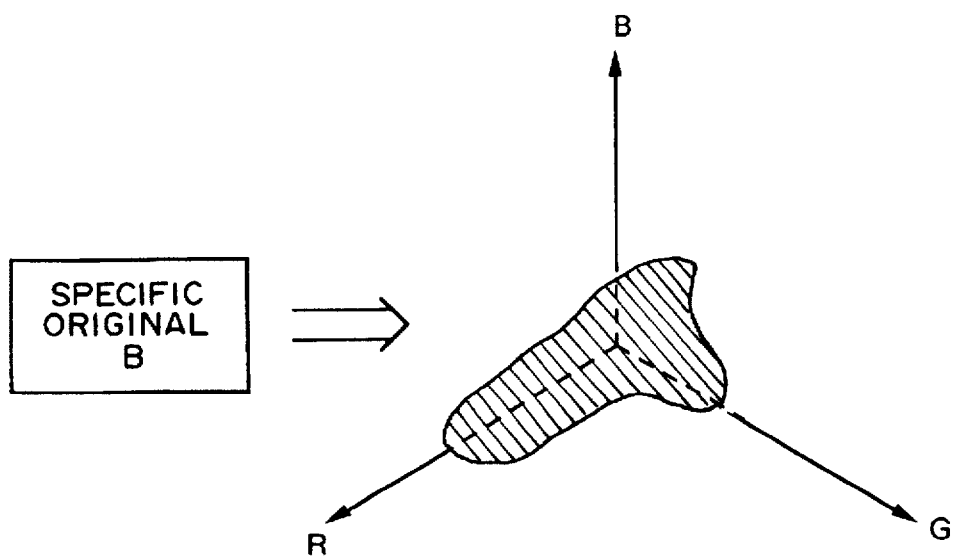
FIG. 12 is a diagram illustrating the distribution of the the data obtained from the specific original B in the color space in the first embodiment.

In the construction described above, when one of the plurality of prohibited masters (B~H) registered with the ROM 204 coincides with the observed image data in the color space, the real-time change signal f (signal line 113) is set to "1" (HIGH). It should be noted that the data of the prohibited master A is not used to form the real-time signal f. FIG. 12 shows the distribution of the prohibited master B in the color space.

When the color distribution of the image data obtained by reading the test original 1801, shown in FIG. 18, by the color sensor 101 coincides with the color distribution of the prohibited master A stored in the ROM 204 beforehand, the test original judgment signal J (signal line 114) is set to "1" (HIGH).

(PRINT-SIGNAL GENERATION CIRCUIT)

Figure 6:
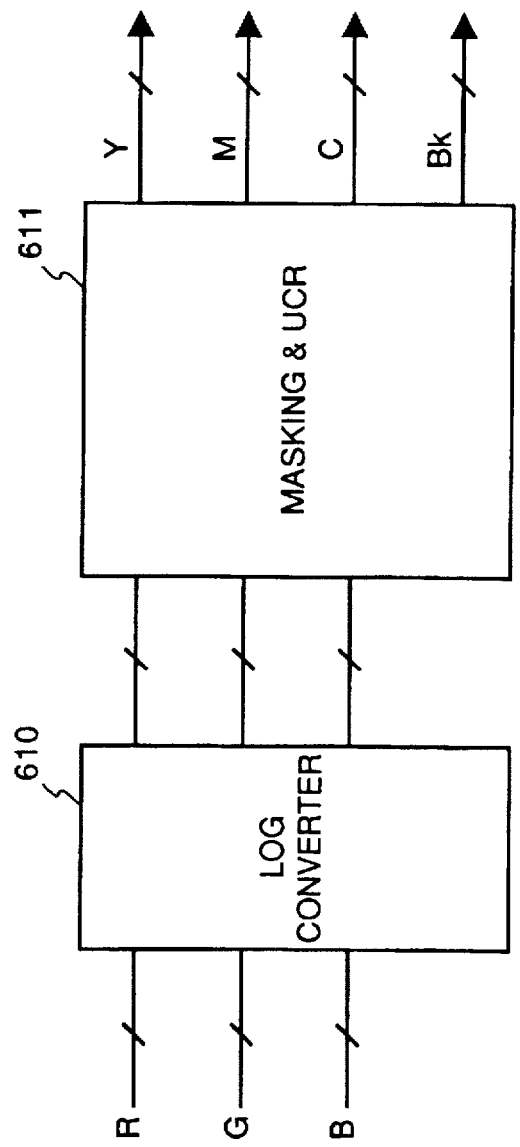
FIG. 6 is a block diagram illustrating the construction of a print-signal generation circuit 105 of the first embodiment.

FIG. 6 is a block diagram illustrating the construction of the print-signal generation circuit according to the first embodiment. In FIG. 6, numeral 610 is a log converter and numeral 611 is a masking-UCR circuit.

In the construction above, the log converter 610 converts the R, G, B signals outputted from the correction circuit 1601 to the density signals. Y, M, C, Bk. The masking-UCR circuit 611 implements masking and under color removal based upon a density signal and the result is outputted to the color printer 10.

Figure 15:
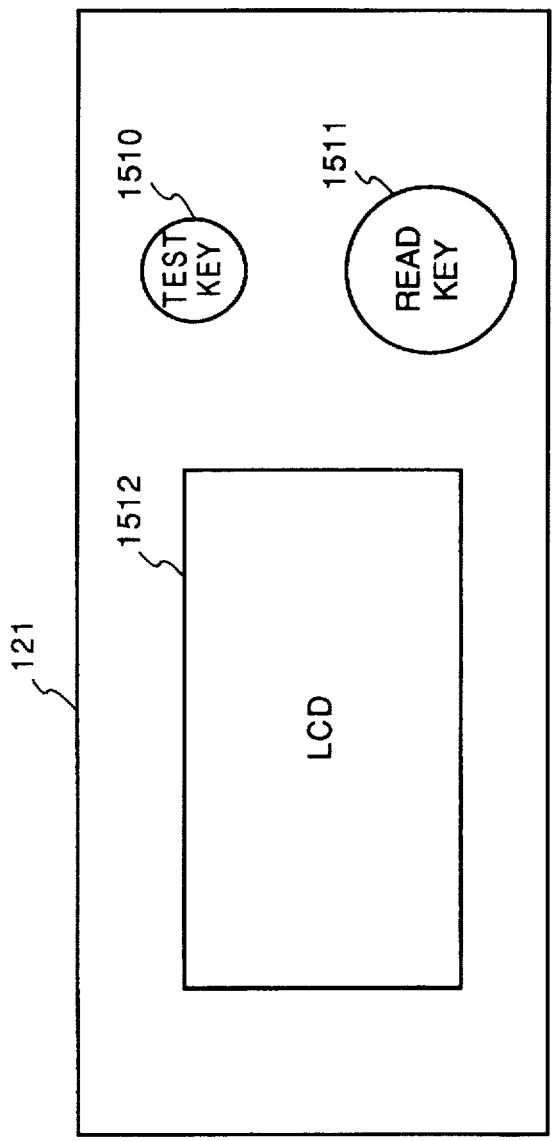
FIG. 15 is a top view illustrating the operational surface of an operation unit 121 according to the first embodiment.

FIG. 15 is a top plan view illustrating an operational surface of the operation unit 121 according to the first embodiment. The operation unit 121 shown in FIG. 15 comprises a test key 1510 for designating to test the original judgment, read-key 1511 for designating reading the original, and liquid crystal display (LCD) 1512 for displaying various messages in the process of testing.

In the operation unit 121 shown in FIG. 15, in the case where the test key 1510 is pressed, the judgement (test for the judging function) using the prohibited master A is started in a judgment function test mode. In the case where the read-key 1511 is pressed, the original is read in an ordinary copy mode.

Figure 16:
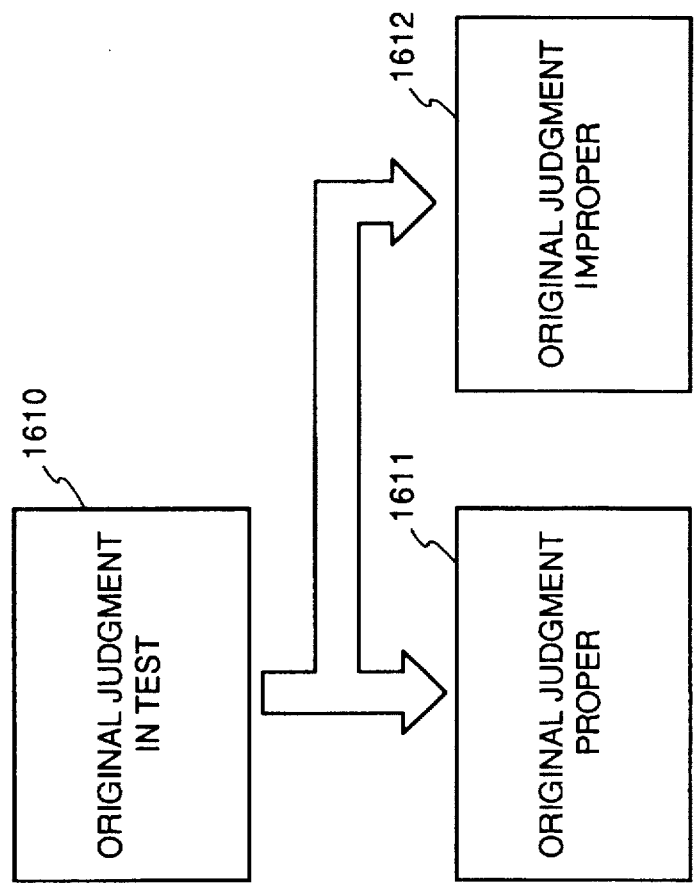
FIG. 16 is a diagram illustrating an example of display of the first embodiment.
Figure 17:
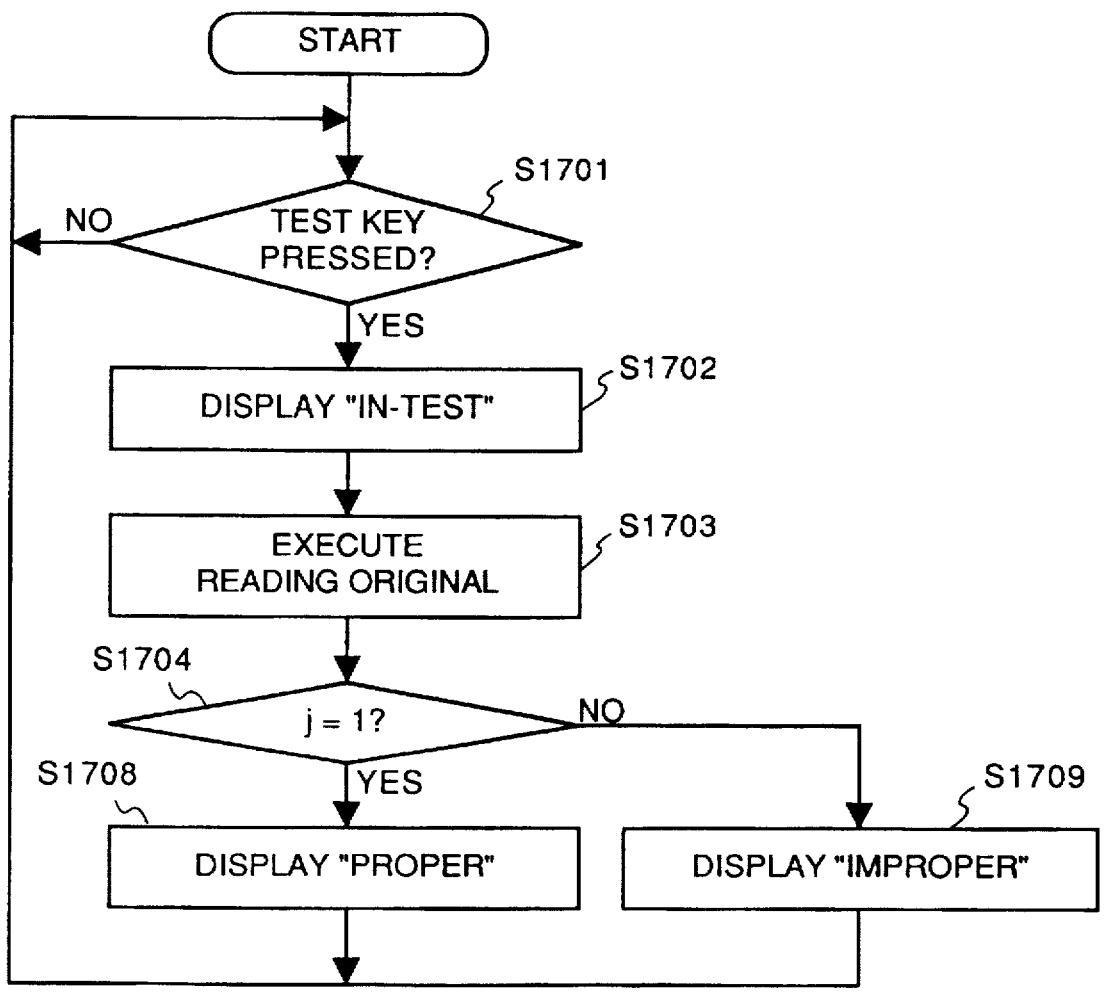
FIG. 17 is a flowchart for describing the operation of the CPU 120 according to the first embodiment.

The operation is described below. FIG. 16 is a diagram illustrating an example of the first embodiment and FIG. 17 is a flowchart for describing the operation by the CPU 120 according to the first embodiment.

At step S1701, the apparatus waits for the moment when the test key 1510 on the operation unit 121 shown in FIG. 15 is pressed by an operator. Of course, the operator places the test original 1801 on the platen beforehand.

When the test key 1510 is pressed, as shown in FIG. 16, at step S1702, the massage "ORIGINAL JUDGMENT IN TEST" indicating that the test has started is displayed on the LCD 1512.

At step S1703, the operation for reading the test original is executed.

Subsequently, the color-space-matching judgment circuit 106 and real-time change signal generation circuit 107 are operated and a test original judgment signal J (signal line 114) which is the result of judgment can be obtained.

Accordingly, when the operation for reading the test original and judgment ends, it is examined whether or not the test original judgment signal J (signal line 114) is in the state of "1" (HIGH) at step S1704. If J =1 (signal line 114), as shown in FIG. 16, the message "ORIGINAL JUDGMENT PROPERLY IN PROCESS" indicating that the original judging function is properly processed is displayed on the LCD 1512 (step S1708).

On the other hand, if J=0 (signal line 114), the message "ORIGINAL JUDGMENT IMPROPER" indicating that there is something wrong with the judging function is displayed on the LCD 1512 (step S1709).

As described above, in the judgment function test mode, it is judged whether the judging function is properly operating by comparing the color distribution of the image data obtained by reading the test original by the color sensor 101 and that of the prohibited master A stored in the ROM 204 beforehand.

On the other hand, in the ordinary copy mode, only whether the color distribution of the image data obtained by reading an original is coincident with the color distributions of the prohibited masters B~H is judged and the color distribution of the prohibited master A is not subjected to the judgment. Accordingly, possibility of erroneous judgment by subjecting the prohibited master A in the ordinary copy mode can be prevented.

Furthermore, since ROM 204 and SRAM 209 are designed so as to deal with the data both of the prohibited master A used in the test mode and prohibited masters B~H used in the ordinal copy mode, they do not have to be designed separately for the test mode and ordinal copy mode, resulting in simplifying the construction. Furthermore, in the test mode, it is possible to judge whether the functions of the ROM and SRAM are properly operated.

As described above, according to the first embodiment, the judging function can be easily tested by testing the image judging function for detecting the specific original.

Furthermore, CCD characteristics, image signal, analog processing characteristics can be tested by using the test original and testing relating to the function of the specific original detection can be performed sufficiently.

<Second Embodiment>

The second embodiment is described below.

The first embodiment is the example where the present invention is applied to the copier. However, it does not impose a limitation upon the present invention. The present invention can be applied to the image scanner connecting to a host computer as described below in the second embodiment.

Figure 19:
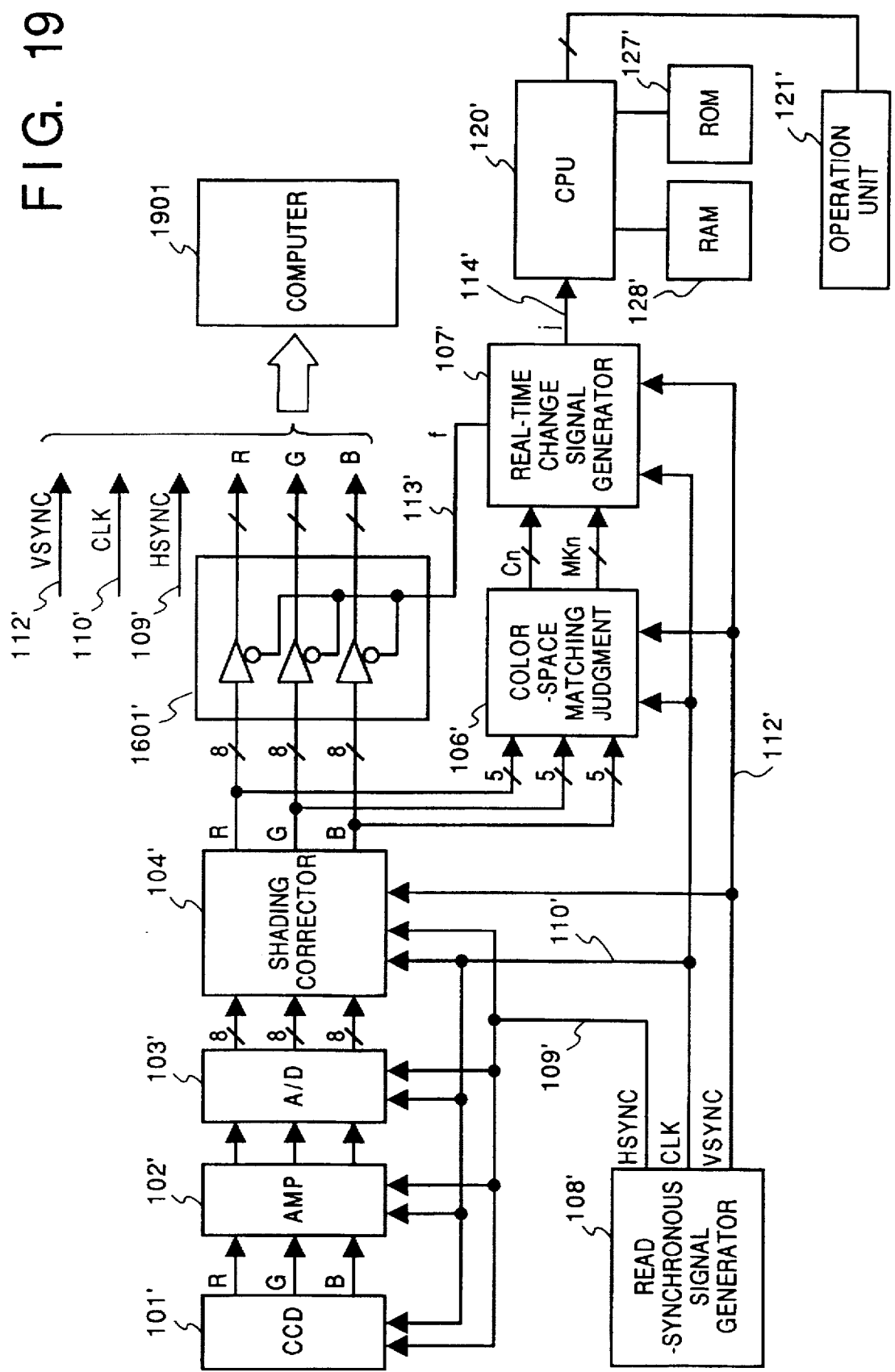
FIG. 19 is a block diagram illustrating the construction of a color image reading apparatus according to a second embodiment of the present invention.

FIG. 19 is a block diagram illustrating the construction of the color image reading apparatus according to the second embodiment. Numeral 1901 denotes a computer. The circuits and signals shown in FIG. 19 which are substantially the same as those in FIG. 1 are designated by reference numerals of the numerals of FIG. 1 with an apostrophe ' and descriptions of these corresponding components are deleted.

The first embodiment differs from the third embodiment in comprising the print-signal generation circuit 105. When the data is outputted from the color image reading apparatus to the color printer 10, as the first embodiment, the print-signal generation circuit 105 is necessary. Accordingly, if the color image reading apparatus is designated to output to the computer 1901, a simple arrangement which does not comprise the print-signal generation circuit 105 can be adopted.

<Third Embodiment>

The third embodiment is described below.

In the above first and second embodiments, the result of the test in the judgment function is displayed by the message and informed to the operator. However, this does not impose a limitation upon the present invention. For example, it can be arranged so that the CPU controls do not begin the reading operation until the test in the judging function ends and finds out that the function is operated in the ordinary copy mode.

Figure 20:
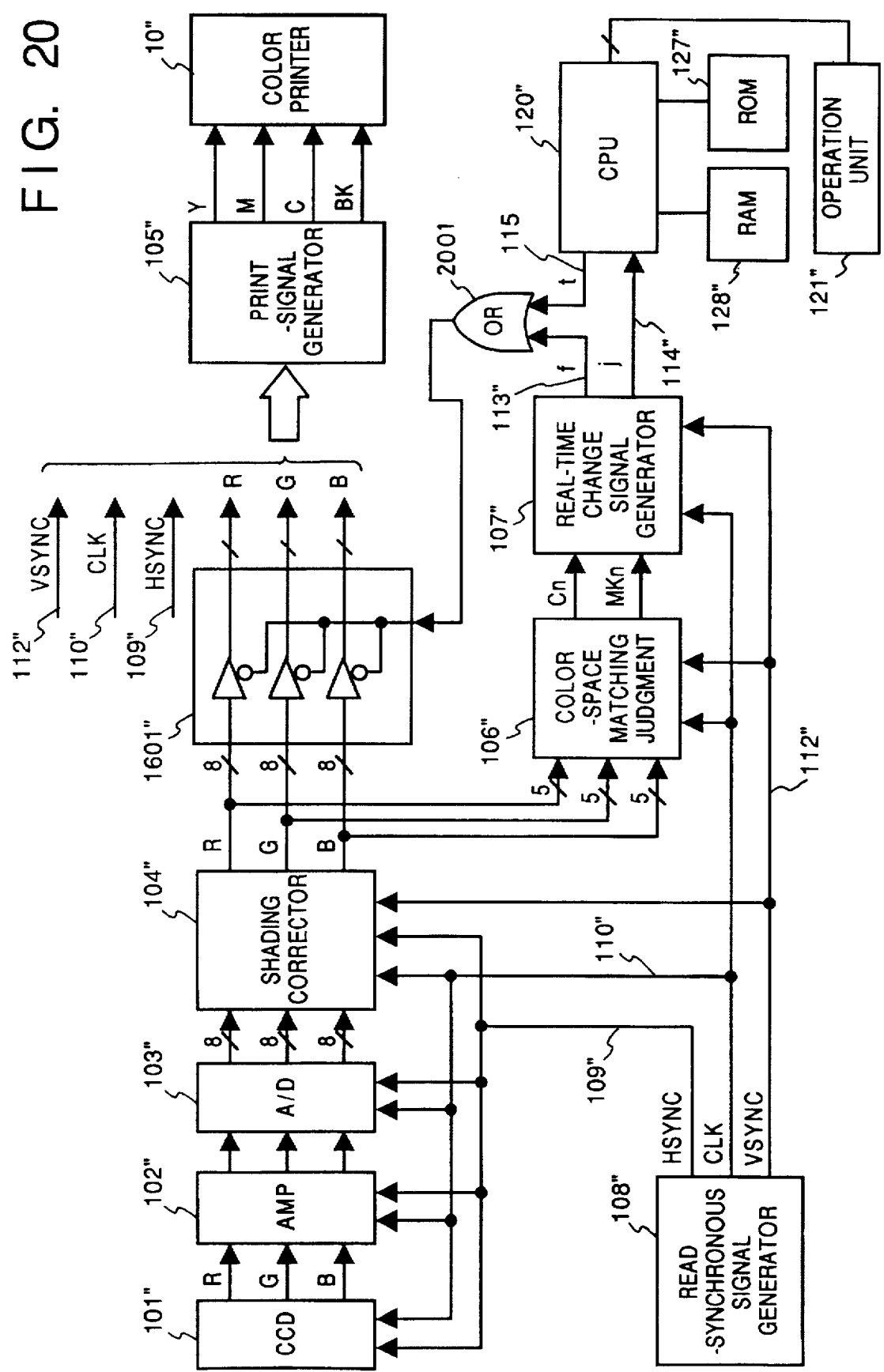
FIG. 20 is a block diagram illustrating the construction of a color image reading apparatus according to the third embodiment.

FIG. 20 is a block diagram illustrating the construction of the color image reading apparatus according to the third embodiment. Numeral 115 is a signal line and numeral 2001 is an OR gate. The circuits and signals shown in FIG. 20 which are substantially the same as these in FIG. 1 are designated by reference numerals of the numerals of FIG. 1 with a double-apostrophes " and descriptions of these corresponding components are deleted.

The third embodiment of FIG. 20 differs from the first embodiment of FIG. 1 in that, in the OR gate 2001, the modifying circuit 1601" executes a correction in accordance with a signal obtained by taking an OR of a real-time change signal f and external control signal t, that is, a signal obtained by processing the result of whether the original to be copied is the specific original by the external control signal control signal t.

The operation of the third embodiment is described.

Figure 21:
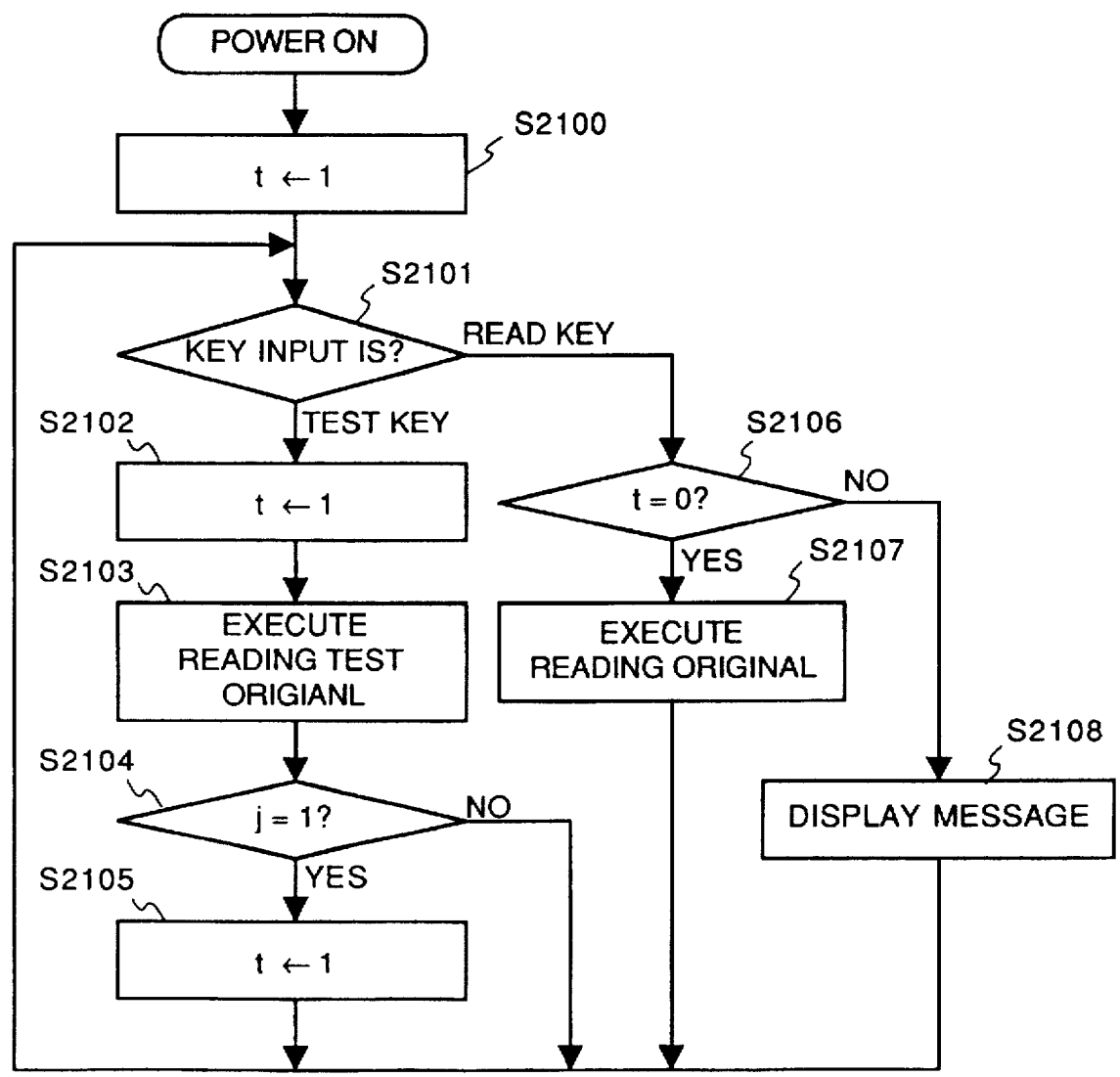
FIG. 21 is a flowchart for describing the operation of the CPU" according to the third embodiment.

FIG. 21 is a flowchart for describing the operation by the CPU 120" according to the third embodiment.

Figure 22:
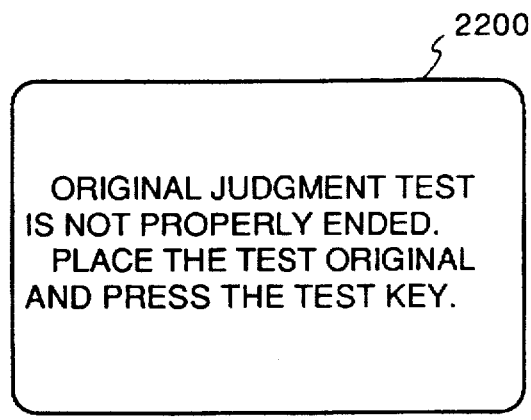
FIG. 22 is a diagram illustrating an example of display according to the third embodiment.
Figure 23:
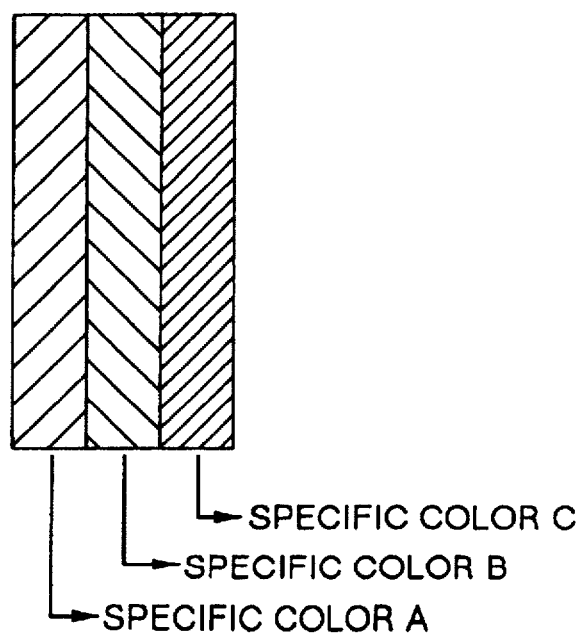
FIG. 23 is a diagram for explaining the fourth embodiment.

FIG. 22 is a diagram illustrating an example of display according to the third embodiment.

At step S2100, the external control signal t (signal line 115) is set to "1" (HIGH) by the CPU" when the power of the reading apparatus is turned on.

At step S2101, when the test key (corresponding to the test key 1510) is pressed, the processes from steps S2102~S2105 are performed, and when the read key (corresponding to the read key 1511) is pressed, the processes from steps S2106~S2108 are performed.

When the test key (corresponding to the test key 1510) is pressed, at step S2101, the external control signal t (signal line 115) is set to "1" (HIGH).

At step S2103, the test original is read. At step S2104, it is examined if the test original judgment signal J (signal line 114) is in the state of "1" (HIGH). If J=1 (signal line 114), the external control signal t (signal line 115) is set to "0" (LOW) at step S2105. Accordingly, the reading of the original to be copied is authorized when the external control signal t is set to "LOW" (t=0). While, when the external control signal t is set to "HIGH (t=1)", the reading of the original to be copied is not authorized.

After step S2101, when the read key (corresponding to the read key 1511) is pressed, at step S2106, it is examined if the external control signal t (signal line 115) is in the state of "0" (LOW). If t=0 (signal line 115) indicative of the state of "LOW", the process proceeds to step S2107 where the reading operation of the original to be copied is executed. If the external control signal t is in the state of "HIGH" (t=1), the process proceeds to step S2108 where the message 2200 shown in FIG. 22 is displayed on the LCD (corresponding to the LCD 1512). This display urges the operator to execute the accurate and correct judging function.

As described above, according to the third embodiment, the function of the judging operation is assured by not transmitting the image signal to the printer until the test in the judging function ends properly.

The present invention can be applied to a system constituted by a plurality of devices, or to an apparatus comprising a single device. Furthermore, it goes without saying that the invention is applicable also to a case where the object of the invention is attained by supplying a program to a system or apparatus.

In the present invention, an ink-jet printer and thermosensitive-transfer printer other than a laser bean printer can be used as image output means.

Furthermore, in the present invention, a host computer, video camera, still-video camera, and film reader for reading color films other than the image scanner which scans the original by the CCD sensor can be used as input means.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus having a specific image judging function, comprising:

judging means for performing the specific image judging function of judging similarity between an image represented by input image data and a specific image which is prohibited from being duplicated;

testing means for testing the specific image judging function of said judging means; and mode setting means for setting said image processing apparatus to one of a first mode, in which said judging means performs an ordinary specific image judging operation, and a second mode, in which said judging means performs a test judging operation whereby said testing means tests the specific image judging function of said judging means, and wherein said judging means, when said image processing apparatus is in said second mode, uses an original for testing which is different from the specific image, and which has color information which is similar to that of the specific image.

2. The image processing apparatus according to claim 1, wherein said testing means comprises output means for outputting a testing result of the specific image judging function.

3. The image processing apparatus according to claim 2, wherein said output means comprises:

display means for displaying one of a message indicating that said judging means is properly operating, and a message indicating that said judging means is improperly operating in accordance with the testing result output from said output means.

4. The image processing apparatus according to claim 1, wherein said judging means uses judging data for judging, and wherein said testing means performs testing by using the judging data and a judging standard not based on said specific image.

5. The image processing apparatus according to claim 1, further comprising:

processing means for processing the input image data in accordance with the judgment result of said judging means.

6. An image forming apparatus having an original judging function, comprising:

judging means for performing a judging function of judging similarity between an image represented by input image data and a specific image which is prohibited from being duplicated;

image forming means for forming an image based on the input image data;

testing means for testing the judging function of said judging means; and control means for controlling said image forming means so as not to form the image properly in a first case where said judging means judges the image represented by the input image data to be similar to the specific image, and in a second case where said testing means detects an abnormality in the judging function of said judging means.

7. The image forming apparatus according to claim 6, wherein said testing means comprises output means for outputting a testing result of the judging function.

8. The image forming apparatus according to claim 6, further comprising display means for displaying a message indicating that the testing performed by said testing means should be re-executed in a case where a predetermined testing result is not obtained.

9. The image forming apparatus according to claim 6, wherein said judging means judges in accordance with a color distribution of an image.

10. The image forming apparatus according to claim 6, wherein said control means controls said image forming means so as not to output an image based on the input image data.

11. A method of testing a specific original judging function in an image processing apparatus having judging means for judging a specific original which is prohibited from being duplicated, comprising the steps of:

reading an original for testing which is different from the specific original, and which has color information which is similar to that of the specific original;

judging similarity between data obtained from the original read in said reading step and previously stored data corresponding to the specific original; and determining whether the specific original judging function is properly functioning in accordance with a judging result from said judging step.

12. The method according to claim 11, further comprising the step of informing that said specific original judging function is improperly functioning.

13. The method according to claim 11, further comprising the step of suspending an image processing by said image processing apparatus in a case where the specific original judging function is improperly functioning.

14. An image forming apparatus comprising:

processing means for processing input image data in accordance with an image forming sequence;

judging means for judging a similarity between the input image data processed by said processing means and image data for a specific image which is prohibited from being duplicated;

control means for controlling said processing means and said judging means so that said processing means processes test image data and said judging means judges a similarity between the test image data processed by said processing means and image data for a specific test image which is different from the specific image which is prohibited from being duplicated; and output means for outputting a judging result for the test image data.

15. The image forming apparatus according to claim 14, wherein the judging means judges the similarity based on a characteristic of color in the input image data.

16. The image forming apparatus according to claim 14, wherein the judging means judges the similarity between the input image data processed in accordance with the image forming sequence and plural kinds of image data for specific originals.

17. The image forming apparatus according to claim 14, wherein the judging means judges the similarity in real time.

18. The image forming apparatus according to claim 14, wherein the output means outputs the judging result as a character.

19. The image forming apparatus according to claim 14, wherein the output means outputs the judging result on a display.

20. A judging circuit comprising:

a judging section for judging a similarity between input image data processed in accordance with an image forming sequence and image data for a specific image which is prohibited from being duplicated;

a control section for controlling the judging section so that the judging section judges a similarity between test image data processed in accordance with the image forming sequence and image data for a specific test image that is different from the specific image which is prohibited from being duplicated; and an output section for outputting a judging result of the test image data.

21. The judging circuit according to claim 20, wherein the judging section judges the similarity based on a characteristic of color in the input image data.

22. The judging circuit according to claim 20, wherein the judging section judges the similarity between the input image data processed in accordance with the image forming sequence and plural kinds of image data for specific originals.

23. The judging circuit according to claim 20, wherein the judging section judges the similarity in real time.

24. A method for judging a similarity between input image data, comprising:

a judging step for judging a similarity between input image data processed in accordance with an image forming sequence and image data for a specific image which is prohibited from being duplicated;

a control step for controlling judging performed in the judging step such that the judging judges a similarity between test image data processed in accordance with the image forming sequence and image data for a specific test image that is different from the specific image which is prohibited from being duplicated; and an outputting step for outputting a judging result of the test image data.

25. The method according to claim 24, wherein the judging step judges the similarity based on a characteristic of color in the input image data.

26. The method according to claim 24, wherein the judging step judges the similarity between the input image data processed in accordance with the image forming sequence and plural kinds of image data for specific originals.

27. The method according to claim 24, wherein the judging step judges the similarity in real time.

* * * * *